United States Patent [19]

Wheelock

[11] Patent Number: 4,587,009

[45] Date of Patent: May 6, 1986

[54] HYDROCARBON HYDROGENATION WITH THERMALLY STABLE MIXED TITANIUM OXIDE GELS

[75] Inventor: Kenneth S. Wheelock, Baton Rouge, La.

[73] Assignee: Exxon Research and Engineering Co., Florham Park, N.J.

[21] Appl. No.: 751,026

[22] Filed: Jul. 2, 1985

Related U.S. Application Data

[63] Continuation-in-part of Ser. No. 662,596, Oct. 19, 1984, abandoned, which is a continuation-in-part of Ser. No. 452,839, Dec. 23, 1982, Pat. No. 4,499,195.

[51] Int. Cl.$^4$ .................. C10G 45/38; C10G 45/40; C10G 45/68; C10G 45/70
[52] U.S. Cl. .................. 208/111; 208/136; 208/137; 208/138; 208/143
[58] Field of Search .............. 208/111, 120, 134, 136, 208/137, 143, 138

[56] References Cited

U.S. PATENT DOCUMENTS

| | | | |
|---|---|---|---|
| 3,092,457 | 6/1963 | Sprague | 423/612 |
| 3,959,118 | 5/1976 | Granquist | 208/116 |
| 3,976,598 | 8/1976 | Daviditz | 423/118 |
| 4,040,974 | 8/1977 | Wright et al. | 423/333 |
| 4,339,353 | 7/1982 | Weisz et al. | 208/111 |
| 4,487,983 | 12/1984 | Miller et al. | 585/454 |

*Primary Examiner*—John Doll
*Assistant Examiner*—O. Chaudhuri
*Attorney, Agent, or Firm*—Llewellyn A. Proctor

[57] ABSTRACT

Hydrogenation of hydrocarbons with catalysts produced by co-gelling a smectite with an inorganic metal oxide which is unstable with respect to retaining a high surface area, to produce a co-gel of high surface area which has good retention of surface area at high temperatures. Suitable smectites for the practice of this invention are hectorite, chlorite, montmorillionite, beidellite, or admixtures of two or more of these materials with each other or with other materials, or the like. Exemplary of inorganic oxide gels suitable for the practice of this invention are the Group IV-B metal oxides, especially titanium oxide, and other metal oxides such as the oxides of thorium, uranium, silicon, aluminum, and the like. A crystalline aluminosilicate zeolite can be composited with this material to supply an acidic function.

8 Claims, No Drawings

HYDROCARBON HYDROGENATION WITH THERMALLY STABLE MIXED TITANIUM OXIDE GELS

RELATED APPLICATION(S)

This is a continuation-in-part of application Ser. No. 662,596, filed Oct. 19, 1984, now abandoned, which in turn is a continuation-in-part of application Ser. No. 452,839, filed Dec. 23, 1982, now U.S. Pat. No. 4,499,195, which issued Feb. 12, 1985.

Field of the Invention

This invention relates to a process for the conversion of hydrocarbons by reaction of a hydrocarbon feed over a catalyst comprised of a thermally stable, high surface area inorganic oxide gel. In particular, it relates to a hydrocarbon conversion process utilizing compositions produced by the thermal stabilization and formation of mixed titanium oxide gels, or co-gels.

Background and Problems

Inorganic oxide gels have been known and used for many years for various purposes, e.g., as adsorbents, catalyst supports, and catalysts. Few of these gels, in the relative sense, however, have been as catalyst supports because only a handful have sufficient surface area and adequate pore volume, particularly at present-day process conditions. Thus alumina ($Al_2O_3$), silica ($SiO_2$), silica-alumina ($SiO_2$—$Al_2O_3$), and crystalline silica-alumina ($SiO_2$—$Al_2O_3$) such as the zeolites, represent the preponderance of the inorganic oxide gels which have been commercially used as catalyst supports, or catalysts in the petroleum, chemical and related industries. These inorganic oxide gels, which are the exceptions among the inorganic oxide gels, can be prepared in forms which have high surface area and adequate pore volume, and they are stable in most environments at high temperatures. Most other inorganic oxide gels, even if they can be prepared in form having adequate high surface area and pore volume, are not stable at high temperatures. For example, titanium oxide ($TiO_2$) can be prepared in high surface area form, but at normal hydrocarbon processing temperatures, i.e., about 750° F. to about 930° F., and higher, titanium oxide loses its surface area. Consequentially, titanium oxide is unsuitable as a catalyst carrier or catalyst at normal hydrocarbon processing conditions.

The preparation of titanium oxide gels is disclosed, e.g., in U.S. Pat. No. 2,682,242; U.S. Pat. No. 2,553,402; U.S. Pat. No. 2,584,286; and U.S. Pat. No. 3,092,457. Particular reference is made to this latter reference, i.e., U.S. Pat. No. 3,092,457, which issued June 4, 1968, to James W. Sprague. This patent discloses the preparation of a titania gel of good purity with reasonably high surface area. In accordance with the Sprague patent, titanium isopropoxide was acetolyzed with glacial acetic acid, and the resulting solution then hydrolyzed with water to form a clear sol which gelled overnight. The hydrolyzed gel was then dried, calcined and the gel ground to a small particle size to provide particles of surface area ranging from 75 to 125 $m^2/g$.

Certain classes of expandable clay minerals, or smectites have been used as adsorbents, but very little has been reported in the literature regarding the use of these materials as catalysts. The adsorption of aromatics such as benzene and phenol from aqueous solution on smectites such as montmorillionite has been reported but these materials also lack thermal stability. Most of the literature in the last few years has dealt mainly with the preparation and physical properties of these materials. However, two recent publications by J. Shabtai et al, viz. J. Shabtai, R. Lazar and A. Obead—*Tokyo Catalysis Congress* 1980 Preprints, and J. Shabtai, R. Lazar and N. Frydman—*J. Chem. Soc.* 1977 pg. 660, do disclose the catalytic activity of montmorillionites in cracking and esterification reactions. A hydrogenation catalyst is reported by T. Pinnavaia using hectorite. Reference is made to W. Quayle and T. J. Pinnavaia, *Inorg. Chem.* 18, 10, 2840, 1979. Stable pillared interlayered clay compositions which possess considerable micropore volume and have useful adsorbent and catalytic properties are prepared, as described in U.S. Pat. No. 4,176,090 by reacting smectite type clays with polymeric cationic hydroxy metal complexes of metals such as aluminum, zirconium, and/or titanium. The use of smectites as catalysts, however, is quite limited due to their low surface area and their insufficient thermal stability in high-temperature processes.

It is accordingly a primary objective of the present invention to obviate these and other prior art deficiencies and, in particular, to provide the art with a process for the conversion of a hydrocarbon feed over catalysts comprised of new and improved oxide catalyst supports having improved surface area, particularly titania oxide catalyst supports or titania oxide catalysts which significantly retain their surface area at relatively high temperatures.

A specific object is to provide a high temperature hydrocarbon conversion process utilizing a catalyst comprised of a titanium oxide co-gel with relatively high surface area which can be thermally activated at relatively high temperatures without significant loss of surface area.

These objects and others are achieved in accordance with the present invention embodying a hydrocarbon conversion process which utilizes catalyst compositions made by co-gelling a smectite with a Group IV-B metal oxide of the Periodic Table of the Elements (E. H. Sargent & Co., Copyright 1962 Dyna-Slide Co.), e.g., titanium oxide, zirconium oxide, hafnium oxide, and the like; and other metal oxides such as an oxide of thorium, uranium, silicon, aluminum, and the like; particularly an inorganic metal oxide which is unstable with respect to retaining a high surface area, to produce a co-gel of high surface area which has good retention of surface area at high temperatures. Suitable smectites for cogelling in this manner are hectorite, chlorite, montmorillionite, beidellite, or admixtures of two or more of these materials with each other or with other materials, or the like.

In a preferred embodiment, a titanium dioxide gel is stabilized against thermal desurfacing by co-gelling said titanium dioxide gel with a smectite. The resultant co-gel is one having a surface area higher than the original titanium oxide gel, or smectite, and the co-gel has good surface area retention at high temperatures such as is required in processing hydrocarbons. A titania gel is first prepared by the acetolysis of an organo-, or hydrocarbyl titanium compound, or salt, by a conventional method as disclosed in U.S. Pat. No. 3,092,457, supra, herewith incorporated by reference. An organo-, or hydrocarbyl titanium compound, suitably an organic ester of titanic acid, e.g., tetraisopropyl titanate, is reacted with glacial acetic acid in solution, suitably e.g., an alcohol/water solution, and reaction continued until acetolysis is complete. To this solution, after completion of acetolysis, is then added the smectite gel, and water, suitably as an aqueous solution of the smectite gel, to hydrolyze the reaction product resultant from the acetotysis. On setting, a co-gel of the titanium oxide gel and smectite is formed. The co-gel is separated from the solution, dried and calcined. The composition which is produced possesses a greater surface area than either of its components as inorganic oxides, and has a greater thermal stability toward loss of surface area. The resultant composition is useful for effecting catalytic conversions either alone or when supported on a carrier, and with or without the additional presence of other catalytically active components composited therewith or dispersed thereon as supported metals.

The process of this invention is conducted by reacting a hydrocarbon feed, with or without the additional presence of hydrogen, at reaction conditions over a catalyst composition made by cogelling a smectite with a Group IV-B metal oxide, preferably titanium oxide, as discussed. Where hydrogen is employed, a hydrogenation-dehydrogenation (hydrogen-transfer) component is composited with the catalyst. Preferred hydrogenation components are the active metals, or the salts or compounds, i.e., oxides, or sulfides, of Group VIB and VIII of the Periodic Table of the Elements (E. H. Sargent & Co., Copyright 1964 by Dyna-Slide Co.), exemplary of which are molybdenum, iron, cobalt, nickel, ruthenium, rhodium, palladium, osmium, iridium, and platinum. The amount of the hydrogenating metals can vary widely, generally between about 0.05 percent and 30 percent, based on the weight of the catalyst, particularly where a non-noble metal is employed. Preferably, particularly where a noble metal is employed, the concentration of the metal ranges from about 0.05 percent to about 2 percent, based on the weight of the catalyst. The process is generally conducted at temperatures ranging from about 250° F. to about 1100° F., preferably from about 400° F. to about 1000° F. Catalytic cracking reactions are preferably conducted at temperatures ranging from about 900° F. to about 950° F., and hydroprocessing reactions at temperatures ranging from about 400° F. to about 800° F. Pressures generally range from about 0 pounds per square inch gauge (psig) to about 2000 psig, preferably from about 100 psig to about 600 psig. Hydroprocessing reactions are preferably conducted at pressures ranging from about 100 psig to about 600 psig. Space velocities range generally from about 0.1 to about 10 V/H/V, preferably from about 0.5 to about 5 V/H/V. Virtually any kind of mineral oil feedstock can be processed in accordance with the process of this invention, exemplary of which are gas oil, vacuum gas oil, cycle oil, or the like.

The invention will be more fully understood by reference to the following examples, and demonstrations, which illustrate its more salient features. All terms are given in terms of weight except as otherwise specified.

EXAMPLES

(I)

In accordance with the teachings of U.S. Pat. No. 3,092,457, supra, 274.5 g. of titanium isopropoxide was acetolyzed with 250 cc of glacial acetic acid. Instead of hydrolyzing with water as taught by Sprague, 80.0 g. of Bentonite (Curtin technical grade) was dispersed in 500 cc deionized water to which 300 g. of $H_2O$ (ice) was added. When the ice was melted, the Bentonite gel was added to the titanium containing solution with a high rate of stirring to facilitate co-gel formation. An additional 1000 cc of water was added to the gel to facilitate stirring.

This procedure was repeated reversing the order of addition, that is instead of adding the water to the titanium oxide precursor, the titanium oxide precursor was added to the aqueous gel. This procedure is referred to as reverse addition whereas the former is referred to as forward addition.

For purposes of comparison, a $TiO_2$ gel was prepared by a conventional method as also disclosed in U.S. Pat. No. 3,092,457.

All of the gels were calcined for at least 4 hours at 400° C. to remove water and to establish the gel structure. In addition, the Bentonite was also calcined for 4 hours at 400° C. for purposes of comparison. Samples of all the materials so prepared were then calcined for an additional 4 hours at various temperatures ranging from 400°–550° C. The surface areas of the materials calcined at various temperatures were determined by the B.E.T. method, and are presented in Table I.

TABLE I

| Gel Surface Areas (B.E.T. $m^2/g$) | | | | | |
|---|---|---|---|---|---|
| Calcination Temperatures, °C. | | | | Gel | |
| 1st 4 Hrs. | 2nd 4 Hrs. | Bentonite | $TiO_2$ | Bentonite/ $TiO_2$ (forward addition) | Bentonite/ $TiO_2$ (reverse addition) |
| 400 | — | 43.1 | 97.7 | 202.6 | 185.7 |
| 400 | 400 | 45.2 | 97.9 | 204.0 | 191.6 |
| 400 | 450 | 40.6 | 85.0 | 215.8 | 179.3 |
| 400 | 500 | 40.5 | 75.6 | 204.3 | 188.8 |
| 400 | 550 | 44.5 | 62.3 | 210.1 | 164.1 |

The data in Table I clearly show that for the Bentonite-$TiO_2$ gels, a higher surface area results from the co-gel than can be expected from the surface areas of the components, and that the surface area of the co-gel is much more stable with respect to thermal desurfacing that the parent $TiO_2$ gel. In addition, the data also show that forward addition is preferred to reverse addition in terms of creating more surface area in the gel, although both techniques improve the thermal stability. For the case of forward addition, there is no loss of surface area with increasing calcination temperature. For the case of reverse addition, the surface area loss on calcination is much less than would be expected on the basis of simple ratios. Reference is made to Table II.

TABLE II

| Expected Surface Areas of Co-gels (B.E.T. $m^2/g$) | | | | | | |
|---|---|---|---|---|---|---|
| Calcination Temp., °C. | | | Gel | | | |
| | | | Bentonite/$TiO_2$ (forward addition) | | Bentonite/$TiO_2$ (reverse addition) | |
| 1st 4 Hrs. | 2nd 4 Hrs. | $TiO_2$ Actual | Actual | Expected | Actual | Expected |
| 400 | 400 | 97.9 | 204.0 | — | 191.6 | — |
| 400 | 450 | 85.0 | 215.8 | 177.1 | 179.3 | 166.4 |
| 400 | 500 | 75.6 | 204.3 | 157.5 | 188.8 | 148.0 |
| 400 | 550 | 62.3 | 210.1 | 129.8 | 164.1 | 121.9 |

A simple physical mixture of Bentonite and $TiO_2$ gel gives surface areas varying between the limits set by the pure or unmixed components. The quantities used in the preparation of the two Bentonite/$TiO_2$ co-gels would give weights corresponding to a physical mixture of 80 g. Bentonite and 80 g. $TiO_2$. Using surface areas of 45.2 m²/g for the Bentonite and 97.9 m²/g for the TiO₂ gel and the weight ratio of the mixture used in the preparations, i.e., $$\frac{80(45.2) + 80(87.9)}{80 + 80} = 71.55$$

a surface area of 71.55 m²/g would be expected for the co-gel. Instead, depending on the order of addition, surface areas of 204.0 and 191.6 m²/g were obtained at the same calcination conditions. Reference is made to Table 3.

TABLE III

Surface Areas of Physical Mixtures vs. Co-Gels (B.E.T. m²/g)

| Calcination Temperature, °C. | | | | Gel | | | |
|---|---|---|---|---|---|---|---|
| | | | | Bentonite/TiO₂ (forward addition) | | Bentonite/TiO₂ (reverse addition) | |
| 1st 4 Hrs. | 2nd 4 Hrs. | Bentonite | TiO₂ | Co-Gel | Mixture | Co-Gel | Mixture |
| 400 | 400 | 45.2 | 97.9 | 204.0 | 71.6 | 191.6 | 71.6 |
| 400 | 450 | 40.6 | 85.0 | 215.8 | 62.8 | 179.3 | 62.8 |
| 400 | 500 | 40.5 | 75.6 | 204.3 | 58.05 | 188.8 | 58.05 |
| 400 | 550 | 44.5 | 62.3 | 210.1 | 53.4 | 164.1 | 53.4 |

The co-gels thus possess more than twice the surface area of that to be expected on the basis of simple physical mixtures.

The following data show that the titanium dioxide-bentonite co-gel compositions possess catalytic cracking activity, to wit:

(II)

8.70 gms of titanium dioxide-bentonite co-gel 1:1 by weight which had been calcined for four hours at 400° C. and recalcined for four hours at 550° C. was weighed out. Ceric ammonium nitrate in an amount of 0.69 gms was weighed out and dissolved in 5 cc of deionized water. This solution was added to the co-gel by the method of incipient wetness. The preparation was dried in vacuo at 86° C. for three hours, subsequently calcined at 400° C. for two and one-half hours, and the catalyst then tested for catalytic cracking activity in a microactivity test (MAT) essentially similar to ASTM D3907-80. Conversion obtained was 35.1 volume percent, and the hydrogen yield was 0.8878 weight percent based on feed.

(III)

To 50.06 gms of the co-gel described in II was added 18.33 cc of deionized water solution which contained 0.83 gm of ammonium hydrofluoride, $NH_4HF_2$, by the method of incipient wetness. After drying, the catalyst was calcined at 500° C. for five hours. This catalyst was also given a micro activity test for catalytic cracking activity. Conversion obtained was 38.2 volume percent and the hydrogen yield was 0.5342 weight percent on feed.

(IV)

The acidic character of the co-gels of this invention can be increased by compositing an acidic crystalline aluminosilicate zeolite, or more than one crystalline aluminosilicate zeolite with said co-gel. Suitably, such a composite can contain up to about 50 percent of said crystalline aluminosilicate zeolite, or crystalline aluminosilicate zeolites, and preferably contains from about 2 percent to about 25 percent, or more preferably from about 3 percent to about 10 percent of a crystalline aluminosilicate zeolite, based on the weight of the total composition. A catalytically active metal, or metals, can be deposited on either the crystalline aluminosilicate zeolite composite, or the co-gel component, or both. The composite catalysts can also be constituted of the co-gel and zeolite components, and if desirable, a binding component, or components, and a metals and additional components. Such composites are useful as catalysts in petroleum and petrochemical processing.

Composite catalysts containing USY zeolite at both 5 wt. % and 10 wt. % levels, respectively, were made from the thermally stable titanium dioxide bentonite co-gel and USY zeolite. The zeolite was dispersed in aqueous bentonite gel used to hydrolyze the acetolyzed titanium alkoxide. The aqueous bentonite gel was alkalized with aqueous ammonia solution to provide a buffered pH during co-gel synthesis to protect the zeolite from the hydrolytic effects of the acetic acid used to acetolyze the titanium alkoxide.

These catalysts were each charged to a reactor and two separate runs made by passing a gas oil feed over each in standard MAT tests. (MAT is a microactivity test. See *Oil and Gas Journal*, 1966, Vol. 64, pages 7, 84, 85 and Vol. 2, 1971, pages 60–68.) The results are given in Table IV.

TABLE IV

| | 5 Wt. % USY | 10 Wt. % USY |
|---|---|---|
| MAT, Conversion % | 59.9 | 68.7 |
| Hydrogen Yield, Wt. % | 0.5140 | 0.5032 |
| Carbon Yield, Wt. % | 6.8197 | 4.6564 |
| Surface Area, BET | 144.7 | 180.9 |
| Pore Volume | 0.286 | 0.357 |
| Unit Cell Size of USY in Composite | 24.55 | 24.54 |

(V)

A composite catalyst containing as one of its components a thermally stable titania gel, and additional components inclusive of zeolite. This catalyst was used to hydro-refine a catalytically cracked naphtha to reduce the amount of unsaturation, as measured by bromine number, while yet preserving octane.

A 10 g quantity of catalyst was charged into a tubular reactor and maintained therein as a fixed bed. The components of the catalyst are as follows: (1) 44.91 wt. % thermally stable titania gel containing 0.94 wt. % ruthenium and 0.13 wt. % rhodium, (2) 9.98 wt. % USY zeolite, and (3) 45.11 wt. % $Al_2O_3$ as binder. The catalyst would thus analyze for Ru and Rh, respectively, 0.42 wt. % Ru and 0.06 wt. % Rh. The reactor was immersed in a heated sand bath to provide heat for the reaction.

A catalytically cracked naphtha and hydrogen were cocurrently fed upflow into the reactor, product taken from the top of the reactor and passed to a liquid accumulator, while the gas therefrom is passed through a gas flow meter and measured. Periodically, analysis was made of the liquid product to determine its API Gravity. Bromine number, research octane number and these compared with the feed. Reference is made to Table V which lists these results, and also gives the conditions of the reaction, as well as the inlet and outlet gas rates in terms of SCF/B.

TABLE V

| Balance | | Feed | | | | | |
|---|---|---|---|---|---|---|---|
| | | 1 | 2 | 3 | 4 | 5 | 6 |
| Hours on Oil | | 27.80 | 51.80 | 77.30 | 97.00 | 118.80 | 143.00 |
| API @ 60 | 57.10 | 52.80 | 53.30 | 53.60 | 53.30 | 53.60 | 53.60 |
| Bromine No. | 35.00 | 22.00 | 22.00 | 28.00 | 25.00 | 24.00 | 23.00 |
| Research Octane | 92.80 | 91.90 | 91.80 | 91.80 | 91.80 | 92.40 | 92.10 |
| React Temp., °C. | | 496.6 | 496.8 | 493.4 | 494.0 | 496.8 | 496.8 |
| React Pres., PSIG | | 300.0 | 300.0 | 300.0 | 300.0 | 300.0 | 300.0 |
| V/Hr/V | | 1.214 | 1.214 | 1.244 | 1.214 | 1.244 | 1.244 |
| W/Hr/W | | 1.511 | 1.511 | 1.549 | 1.511 | 1.549 | 1.549 |
| Inlet Gas Rate SCF/BBl | | 1,358.1 | 1,358.1 | 1,325.1 | 1,358.1 | 1,325.1 | 1,325.1 |
| Outlet Gas Rate SCF/BBl | | 1,511.9 | 1,530.1 | 1,512.1 | 1,532.2 | 1,548.0 | 1,499.6 |

These data show clearly that the olefins of the catalytically cracked naphtha were saturated, and yet the octane number of the product remained stable. Olefins are known to be of farily high octane, and yet despite the fact that they were hydrogen saturated, the octane stability of the product remained stable. This shows that aromatics concentration was increased.

Having described the invention, what is claimed is:

1. A process for the hydrogenation of a hydrocarbon feed which comprises contacting said feed, in the presence of hydrogen, at temperatures ranging from about 250° F. to about 1100° F., pressures ranging from about 0 psig to about 2000 psig, and space velocities ranging from about 0.1 V/H/V to about 10 V/H/V, with a catalyst comprising a high surface area co-gel of a smectite and an oxide selected from titanium oxide, zirconium oxide, hafnium oxide, thorium oxide, uranium oxide, silicon oxide, and aluminum oxide, upon which there is supported from about 0.05 percent to about 30 percent, based on the weight of the catalyst, of a metal selected from the group consisting of a Group VIB and Group VIII metal hydrogenation-dehydrogenation component.

2. The process of claim 1 wherein the titanium oxide co-gel employed in forming the catalyst upon which the Group VIB or Group VIII metal hydrogenation-dehydrogenation component is supported is prepared by the acetolysis of a hydrocarbyl titanium compound in solution, to which water and the smectite as a gel are added to hydrolyze the reaction product and form said co-gel.

3. The process of claim 2 wherein the smectite co-gelled with the titanium oxide to form the catalyst upon which the Group VIB or Group VIII metal hydrogenation-dehydrogenation component is supported is hectorite, chlorite, momtmorillonite, beidellite, or admixtures of one or more of these materials with each other or with other materials.

4. The process of claim 1 wherein the smectite employed in forming the catalyst upon which the Group VIB or Group VIII metal hydrogenation-dehydrogenation component is supported is hectorite, chlorite, momtmorillonite, beidellite, or admixtures of one or more of these materials with each other or with other materials.

5. The process of claim 1 where the catalyst additionally contains a crystalline aluminosilicate zeolite.

6. The process of claim 1 wherein the Group VIB or Group VIII metal hydrogenation-dehydrogenation component of the catalyst is comprised of molybdenium, iron, cobalt, nickel, ruthenium, rhodium, palladium, osmium, iridium, or platinum.

7. The process of claim 1 wherein the concentration of the Group VIB or Group VIII metal hydrogenation-dehydrogenation component of the catalyst ranges from about 0.05 percent to about 30 percent, based on the weight of the catalyst.

8. The process of claim 6 wherein the hydrogenation-dehydrogenation component is a noble metal, and from about 0.05 percent to about 2 percent of the noble metal is supported on the catalyst, based on the weight of the catalyst.

* * * * *